Feb. 20, 1951        H. B. BARRETT        2,542,616
METAL TURNING AND TRUING MACHINE

Filed Aug. 16, 1946        5 Sheets-Sheet 1

INVENTOR
HARRY B. BARRETT
BY Alfred W Petchaft
ATTORNEY

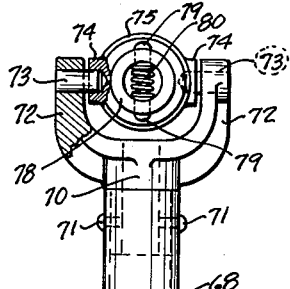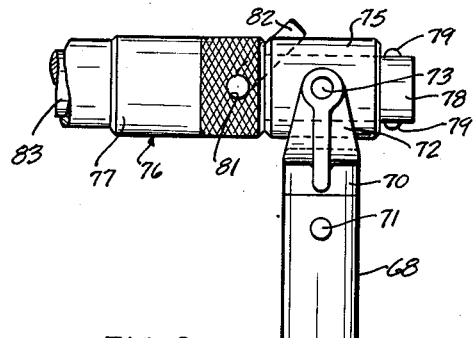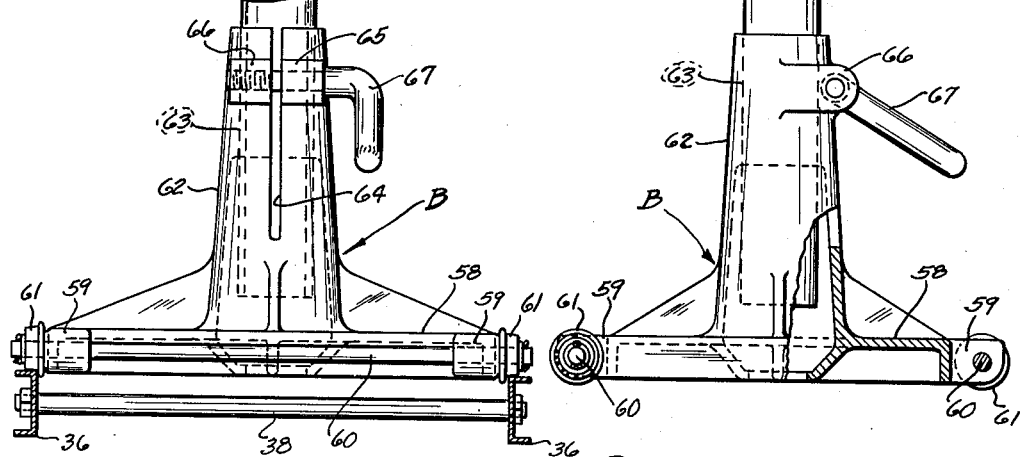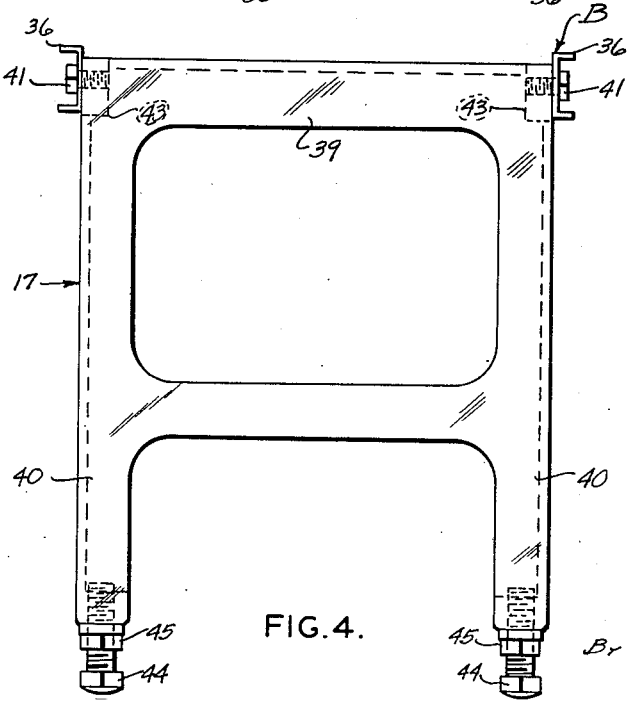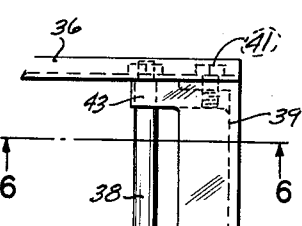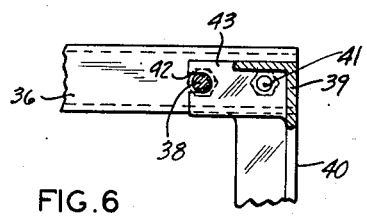

Feb. 20, 1951     H. B. BARRETT     2,542,616
METAL TURNING AND TRUING MACHINE
Filed Aug. 16, 1946     5 Sheets-Sheet 3

INVENTOR
HARRY B. BARRETT
By Alfred W. Petchaft
ATTORNEY

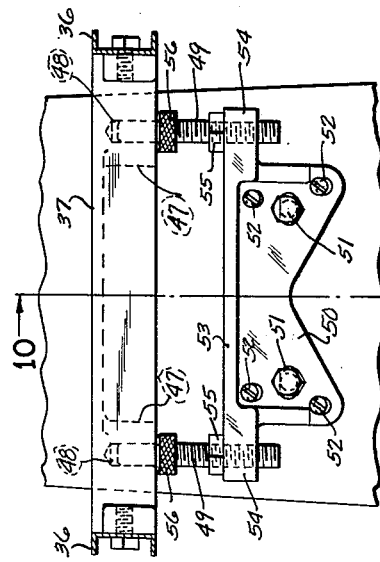

Feb. 20, 1951 H. B. BARRETT 2,542,616
METAL TURNING AND TRUING MACHINE
Filed Aug. 16, 1946 5 Sheets-Sheet 5

INVENTOR
HARRY B. BARRETT
BY Alfred W. Petchaft
ATTORNEY

Patented Feb. 20, 1951

2,542,616

UNITED STATES PATENT OFFICE 2,542,616

METAL TURNING AND TRUING MACHINE

Harry B. Barrett, St. Louis, Mo.

Application August 16, 1946, Serial No. 690,896

5 Claims. (Cl. 77—2)

This invention relates generally to metal turning and truing machines and in particular to new and useful improvements in lathe type metal turning machines of a character adapted for use in the finishing and truing of brake-drums and the like, although the same is not necessarily limited to such particular use.

The objects of my invention reside in the provision of a lathe or machine of the character noted which is simple, durable and economical in construction; which is accurate and reliably precise in metal turning operations, which is adjustable for a wide variety of work, and which is universally adaptable to situations and conditions met in actual service, such as turning, grinding, truing and work surfacing on various types and sizes of brake-drums.

It is a further object of my present invention to provide a brake-drum lathe which can be readily converted from a stationary type of machine to a portable machine, so that, as the particular needs of the job may require, the work may either be brought to the machine or the machine may be brought to the work and, furthermore, when the machine is brought to the work, it is capable of handling brake-drums alone with the pneumatic tire removed from the wheel or brake-drums on wheels from which the tires have not been removed and which are, accordingly, supported by the tire, wheel hub, or rim; thus providing a machine which is capable of meeting practically every type of brake-drum turning encountered in automotive repair shops.

And with the above and other objects in view, my invention resides in the novel features of form, construction, arrangement, and combination of parts presently described and pointed out in the claims.

In the accompanying drawings (five sheets),

Figure 2 is an end elevational view, partly in section, of the outboard support and track carriage assembly, the view being taken at the zone indicated by line 2—2 in Figure 1;

Figure 3 is a side elevational view, partly in section, of the outboard support illustrated in Figure 2;

Figure 4 is an end elevational view of the outboard track support constituting a portion of the present invention;

Figures 5 and 6 are, respectively, a fragmentary top plan view of the corner construction utilized in assembly of the track and track support and a fragmentary sectional elevational view of the same corner construction;

Figure 9 is a fragmentary view, in elevation, of the inboard adjustable assembly for attaching the track means with the lathe standard, this view being taken at line 9—9 in Figure 1;

Figure 10 is a further sectional detail view of the inboard adjustable attachment means for the track assembly as seen along line 10—10 in Figure 9;

Figure 11 is a perspective view of my invention illustrating the same in a form adapted for portability of the entire assembly and for adjusting of its major components;

Figure 12 is a fragmentary elevational view of a part of the assembly shown in Figure 11.

Figure 1:
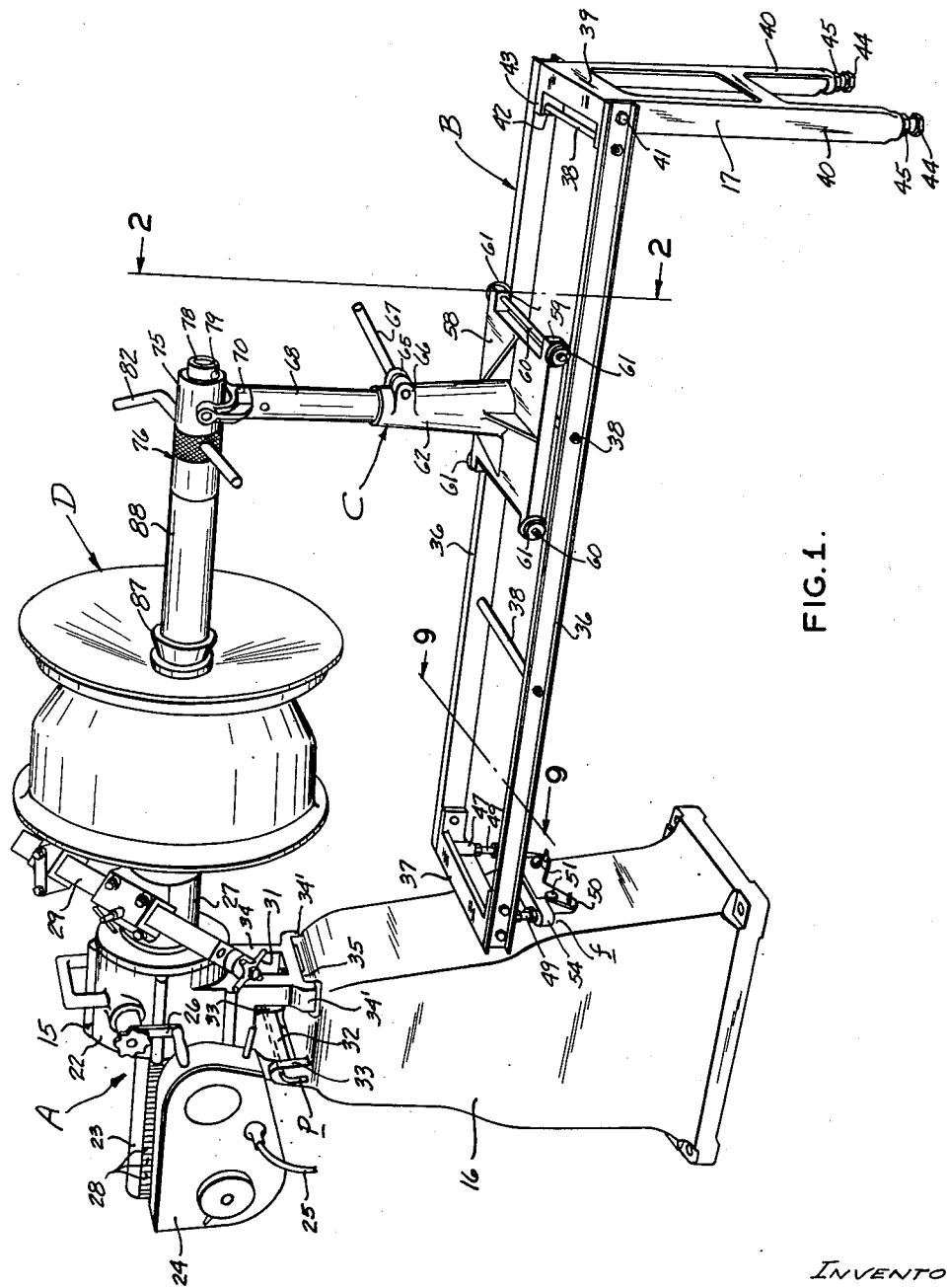
Figure 1 is a perspective view of a lathe constructed in accordance with and embodying my invention.

Referring now in more detail, and by reference characters to the drawings, A designates a brake-drum lathe comprising an operating head 15 suitably mounted on a base or standard 16 adapted to rest on a level floor or support. In co-operation with the base 16 is a trackway B connected with the base means 16 at one of its ends and supported in a level position by a leg-like end frame or support 17.

Provided for shiftable movement along the trackway B toward and away from the lathe A is a movable outboard carriage assembly C which, in co-operation with certain other parts and elements of the machine later to be noted, is adapted to carry the brake-drum D upon which it is desired to perform a turning, truing, grinding or surfacing operation. In other words, the lathe operating head is fixed and the work or object to be operated upon is moved or fed into or away from the lathe. It is also essential that the machine be arranged with the track-way assembly in level position and that the axis of the lathe arbor and its outboard support be exactly in alignment with and parallel to the track for purposes of greater accuracy of results.

The operating head 15 is more fully described in United States Patent No. 2,357,803, and generally comprises a housing 22 in which are operatively mounted power transmission gears (not shown), an axially or longitudinally shiftable arbor 23, a switch panel 24 for mounting controls whereby to regulate current flow from electrical supply line 25 to the motor (not shown) associated with the transmission gears, manually operable crank means 26 for moving the arbor 23 when desired, and a tool carrier 27 suitably sleeved on the arbor adjacent the housing 22 and operatively connected with the transmission gears therein for rotation concentrically about the arbor in a selected plane. The arbor 23 is adapted to extend through the housing 22, tool carrier 27 and the object or brake-drum D for connection with the outboard support or base means C as will appear presently. Therefore, and in order to cause movement or feed of the brake-drum D into the lathe, the rearward portion of the arbor 23 which passes through transmission housing 22 is formed with teeth 28 which are engageable with a suitable pinion gear (not shown) in such housing for the purpose of providing mechanical feed thereof longitudinally through the housing and tool carrier 27. Simultaneously with the longitudinal movement of arbor 23, the tool carrier is rotated so that the tool post or arm 29 with its cutter thereon may rotate relative to the brake-drum D. The arm 29 is detachably secured to the carrier 27 and, further, can be moved relative thereto by means of a cross-feed device indicated generally at 31, but which embodies the usual type of threaded shaft (not shown) operatively engaging the carrier 27 for effecting movement of the arm 29 in a direction normal to the axis of arbor 23.

The housing 22 is preferably integrally formed with a transversely bored depending lug 32 adapted to fit between similarly bored, upstanding ears 33 on base 16, and is pivotally mounted thereon by a removable pin p extending through the lug 32 and the ears 33. Also integrally formed on and depending from the housing 22 is a fore-leg 34 having spaced ears 34' for embracingly engaging a retention boss 35 formed on and projecting upwardly from the base 16.

Track-way B (Figure 1) comprises a pair of spaced and longitudinally extending rails 36 formed of channel shaped members having the flanges directed outwardly and set in a horizontal plane so that the upper flanges constitute the track tread. The rails 36 are secured in assembly by a cross-bar 37, a plurality of intermediate cross-rods 38 spaced along the length of the track, and the end frame 17. The end frame 17, as more particularly disclosed in Figures 4 through 6, integrally comprises a cross-member 39 and two vertical legs 40. At its ends, the cross-member 39 is bolted to the rails 36, as at 41, and has a sliding engagement with the endmost tie-bar 38, as by the notched formation or recess 42 formed in each of a pair of spaced and inwardly extending projections 43 integrally provided on the frame for that purpose. Each of the legs 40 carries at its floor engaging end an adjustable foot element 44 threaded into the leg for permitting the requisite amount of vertical adjustment of the track in obtaining a level position thereof. A lock nut 45 is utilized to retain the foot element in adjusted position.

As disclosed in Figure 1 and in detail in Figures 9 and 10, the inner end of the track-way B, and more particularly the cross-bar 37, is formed with spaced bosses 47, each of which is recessed at 48 to receive, in sliding relation, the upper end of an adjustable element 49 carried on the base 16, as shown. Each element 49 is threadedly received in a bracket plate 50, the latter being rockably mounted upon the forward face f of base 16 by means of bolts 51. Bracket plate 50 is angularly adjustable relative to the base 16 by means of a plurality of set screws 52 which can be threaded toward or away from the base side wall to move the upper flange 53 of plate 50 into a horizontal or level position. In the arrangement disclosed, each element 49 is mounted in a laterally projecting boss 54 of plate 50 and is capable of vertical adjustment with respect thereto. A locking nut 55 secures each of these elements in final position, while a second nut or abutment element 56 carried by each thereof is arranged thereon to be engaged by the cross-bar 37. It can now be seen that each end of the track-way B is capable of vertical adjusting movement so that an accurately leveled position can be obtained. Moreover, the track-way B can be adjusted to be parallel with the lathe arbor, regardless of the fact that it may not be truly level.

Turning now to Figures 1, 2 and 3, it can be seen that the outboard carriage assembly C includes a movable base member 58 formed with corner bosses 59 for supporting axles 60 upon which flanged wheels 61 are rotatably mounted to engage the track elements 36, and a centrally located, upstanding pedestal column 62 having a central bore 63 and a vertical slot 64 provided on opposite sides with ears 65, 66, for the purpose of permitting the two parts of the pedestal column to be moved or flexed in clamp-wise manner upon proper manipulation of a lever 67 which is rotatably mounted in boss 65 and threadedly engageable in boss 66, whereby the bifurcated pedestal column can be flexed into and out of engagement with a post 68 which is thus adjustably mounted in the column 62 and at its upper end is provided with a yoke fitting 70 fixed therein by pins 71. Each arm 72 of the yoke is apertured to receive a pin bearing 73 which projects inwardly for engagement in recessed and laterally projecting boss formations 74 on a bearing sleeve 75 to allow for pivotal movement of the sleeve 75 in a vertical plane about the axis of pin bearings 73. In turn, the pivotal sleeve 75 carries a fitting element 76 of the type having an internally threaded collar 77, an integral bearing sleeve of reduced diameter 78, and a pair of diametrically opposed and outwardly projecting locking pins 79 positioned adjacent the outer end of the bearing sleeve 78. The pins 79 are urged outwardly into locking position by means of a resilient element or coiled spring 80 engageable with the butt ends thereof (Figures 2 and 7) while the outer ends of these pins are rounded off to act as cam surfaces such that, upon movement of the fitting into or out of sleeve 75, the pins will be cammed inwardly to permit passage therethrough of the bearing sleeve. In its operative position, the fitting 76 is free to rotate in sleeve 75 but is normally held against axial displacement due to the pins 79 at the outer end and the shoulder formed between portions 77 and 78 thereof. In addition the fitting 76 is formed with a pair of cross bores 81, in 90° relation, for the reception of a turning tool 82 whereby the fitting may be threaded upon or released from engagement with the outboard threaded end 83 of the lathe arbor 23, as will presently appear.

Figure 7:
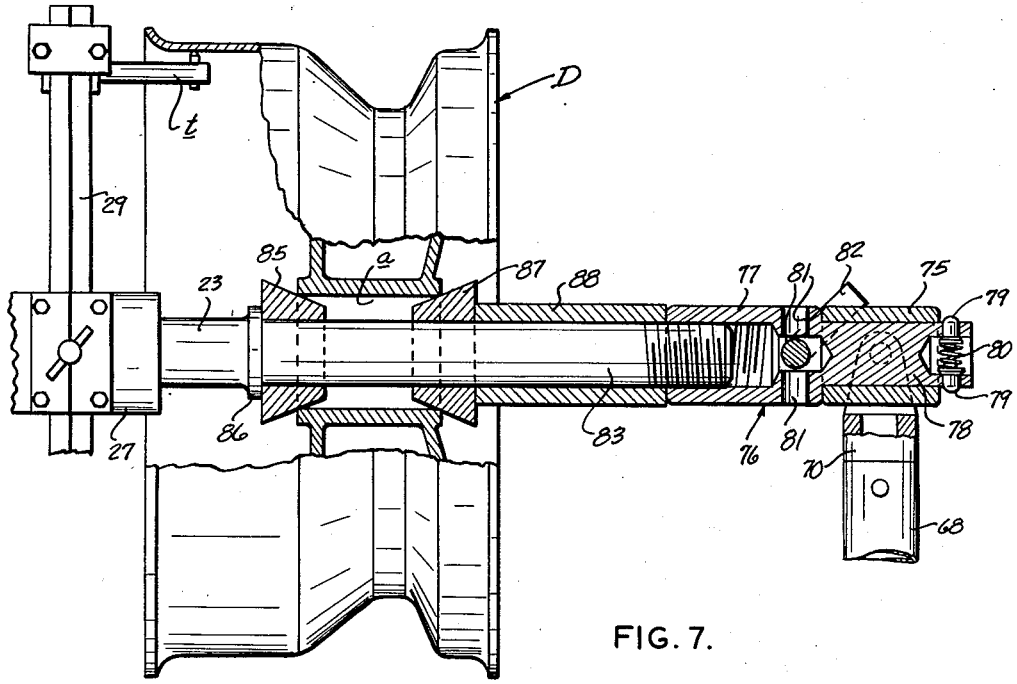
Figure 7 is an enlarged and partial sectional elevational view of the mounting arbor, brake-drum centering means and adjustable disconnect fitting at the outboard supporting means when assembled and in operative position with respect to the lathe cutting tool assembly.

With reference to Figures 1 and 7, the outboard support post 68 is vertically adjustable in pedestal column 62 and arranged for translatory movement on carriage or truck 53, and its fitting 76 is adapted to support the outboard end 83 of lathe arbor 23, as by the threaded connection between the end of the arbor and the sleeve 77. But, prior to this connection being made, the brake-drum D is first moved into approximate position on the arbor 23. In accomplishing this latter operation an inner centering cone 85 is slipped onto the arbor and is positioned in abutment with a seat formed by a flanged shoulder 86. The brake-drum D is then passed over the arbor until the inner end of its central bearing aperture $a$ rests on the inclined face of the cone 85. It is understood, of course, that cone 85 or any equivalent means should be selected from a number of graded sizes and shapes to suit the dimensions of the surface of engagement on the particular brake-drum D. A second cone 87, or equivalent means, is next brought into position adjacent the outer surface of the brake-drum D, followed by an adapter sleeve 88 which abuts against the latter cone, the length of adapter 88 being selected to provide a sufficient projection of the arbor end 83 outwardly thereof for threading engagement within the sleeve 77 of fitting 76. After this approximate assembly has been carried out, the tool 82 is utilized to turn collar 77 upon the arbor until adapter sleeve 88 has pressed cone 87 into a firm seat with brake-drum D, it being understood that the inner cone 85 will also have a firm seat with flange 86 and also with the inner margin of the aperture $a$.

Figure 8:
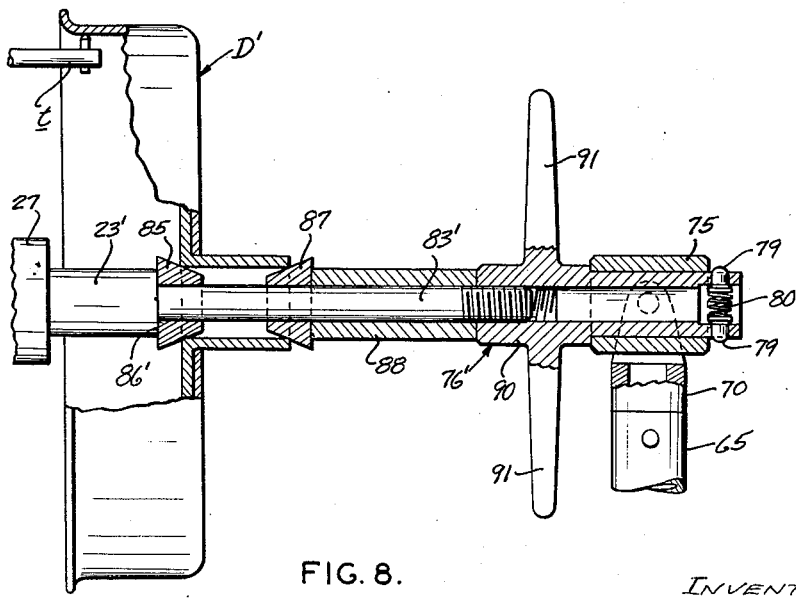
Figure 8 is a view similar to that of the preceding illustration, but indicating a modified adjustable disconnect fitting.

A modified form of fitting 76' as disclosed in Figure 8, comprises a sleeve 90, internally threaded at its inner enlarged end, and provided with spoke handles 91 integrally formed therewith. A brake-drum D' may be thus secured in centered and clamped position by and between the shouldered seat 86 and sleeve 88 upon turning up of the sleeve 90, which is suitably carried at the upper end of outboard support post 65, all as hereinbefore described in connection with Figures 2, 3, and 7.

In practice, the above described lathe type machine is initially set up and conditioned for turning, truing or grinding work by adjusting the track-way B so that it is brought into parallelism with the axis of arbor 23, by vertical adjustment of post 65 of assembly 18 whereby the collar 77 of fitting 76 is in true axial alignment with the arbor. Accomplishing this, the brake-drum D can be mounted upon the arbor 23 and clamped in position as pointed out. Thereafter, the arbor 23 is longitudinally shifted manually by crank 26 until the lathe tool or fly-cutter $t$ is set for the proper depth of cut. At this point, electrical current can be supplied to the lathe motor (not shown) and the machine will function automatically to rotate the cutting tool and feed the arbor axially inwardly to move the work toward the cutter. It will, of course, be understood that the arbor 23 and brake-drum D do not rotate but simply move longitudinally, thus causing carriage C to roll inwardly along the tracks 36 during the operation of the machine.

Figure 13:
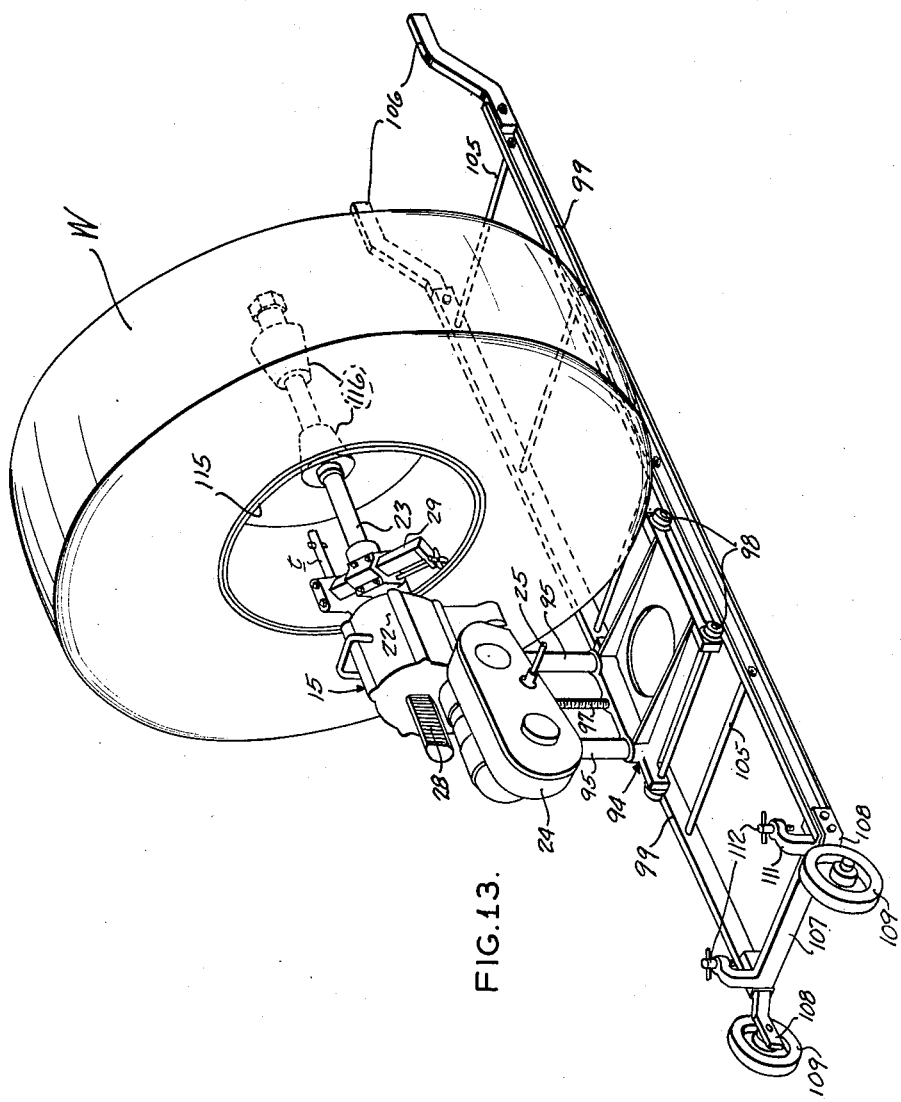
Figure 13 is a perspective view of the portable arrangement of my present invention set up for operation upon the brake-drum of a wheel from which the tire and wheel have not been removed.

The brake-drum-lathe of the present invention may be readily converted into a portable form, as illustrated in Figures 11, 12, and 13, wherein the working head or power operated tool and arbor assembly 15 is substantially identical with the form disclosed in Figure 1. The essential difference of this second arrangement over the first described form resides in the utilization of a base assembly which is in the form of a frame 94 having erect mounting posts 95 upon which an elevator carriage 96 is slidably mounted for vertical work aligning adjustment of the assembly 15. Movement of the carriage 96 is had through a jack shaft 97 arranged to turn in place in frame 94 and thread through a suitable boss (not shown) formed at the rear of the carriage casting 96. Frame 94 has flanged wheels 98 which engage track members 99 of the track-way or frame assembly 100 for translatory movement therealong when so desired. The outboard support carriage C' of this present arrangement comprises a base means or carriage in the form of a casting 101 having flanged roller elements 102 for engagement with the tracks 99, and an upstanding pedestal 103 for adjustable support of the post 68, the latter being fully described in connection with Figures 2 and 3. Post 68 carries the pivoted, sleeved head 75 and fitting 76 to which the work supporting end of arbor 23 is secured when an object, such as that shown at D in Figure 1, is properly positioned for a work operation.

The track frame assembly 100 is constructed for the purpose of rendering it easily portable and comprises rails 99 secured in spaced, parallel relation by a number of the bars 105, a pair of handle members 106 secured against the web of the track elements, a spreader member 107 at the opposite ends of the track elements from handles 106 and vertically offset arms 108 connected to the web of the track elements adjacent the spreader member 107. Each arm 108 mounts a roller element or wheel 109 upon which the whole machine can be transported when so desired. As indicated in Figure 12, each arm 108 is vertically offset such that its wheel 109 normally is held out of contact with the floor or supporting surface while the tracks are resting thereon. However, when the track frame 100 is bodily elevated or lifted by the handles 106 the frame temporarily pivots about the lower edge 110 of the tracks 99 until wheel 109 can be brought into rolling engagement with the floor to carry the weight of the machine. This feature is advantageous in that the machine is rendered immobile while the tracks are resting at full length on the floor or supporting surface. At other times the machine can be transported from place to place without imposing a load at the handles 106 which will be beyond the capability of the average individual to lift.

In furtherance of the universal adaptability of my invention, the member 107 is formed with vertical clamping elements 111 which are directed to overhang the frame 94 adjacent the rear track wheels 98 such that clamp screws 112 threaded therein may engage the frame and prevent its movement along the tracks 99. Likewise the carriage 101 may be clamped to the tracks 99 through appropriate adjustment of hooked straps 113 carried thereby for sliding movement relative to a clamp screw 114 threaded into the carriage 101.

Operation of this latter assembly is capable of somewhat greater flexibility as either the lathe head 15 or the outboard support carriage C' may be immobilized relative to the tracks 99 and operation of the lathe will effect feeding movement of whichever of such members is free, so that the fly-cutter $t$ may be fed into the work or the work may be fed to the cutter, whichever is most suitable.

Where it is desired to turn the brake-drums on truck wheels where the tire and wheel assembly is relatively large and heavy, the brake-drum lathe in its portable form may be rolled over into close proximity to the wheel or the wheel may be rolled over to it, whichever is most convenient. In either case, the wheel W with tire attached, as shown in Figure 13, is set down and cradled, so to speak, between the rails 99 which serve to hold it in upright position. The arbor 23 is then brought into substantially accurate alignment with the center line of the brake-drum 115 by elevating the carriage casting 96 and its associated operating head 15 by suitable rotation of the threaded jack shaft 97. The arbor 23 is thereupon secured concentrically in place by suitable centering cones 116, substantially similar to the previously described centering cones 85, 87, and the clamp screws 112 released, so that the frame 94 may be free to move toward the wheel W and the operating head will thereby in effect "feed itself" into the work.

Moreover, in a machine of the type herein disclosed, it is obviously possible to substitute for the fly-cutter t shown a grinding wheel, hone element, or the like, whereby the machine can be readily made to perform a variety of duties in connection with wheel brake-drums and the like. While the foregoing detailed description relates to presently preferred arrangements for the subject machine, it will be clear that modifications, rearrangements, and substitutions may be made without departing from the scope of my invention as defined in and by the claims hereto annexed.

Having thus described my invention, what I claim and desire to secure by Letters Patent is:

1. A lathe comprising, in combination, a supporting structure providing a base, an extended track-way, an operating head carried on said base and having a work-carrying arbor movable longitudinally through the head in the direction of, and parallel to, the extended track-way, a work-surfacing tool rotatably sleeved on said arbor, a bracket plate rockably mounted on one face of the base, adjustable elements on the inner end of said track-way engaging said bracket plate, and a vertically adjustable support frame adapted to rest on a fixed surface provided at the outer end of said track-way.

2. A lathe comprising, in combination, a supporting structure providing a stationary base, an extended track-way, an operating head carried on said base and having a work-carrying arbor movable longitudinally through the head in the direction of, and parallel to, the extended track-way, a work-surfacing tool rotatably sleeved on said arbor, means movable along said track-way adapted for connection with one end of said arbor in support thereof during a work-surfacing operation, a bracket plate rockably mounted on the face of said base adapted for angular adjustment relative to said base, the lower ends of vertically adjustable elements threadably received in the upper face of said bracket plate, the upper ends of said vertically adjustable elements engaging the inner end of said track-way, a support frame adapted to rest on a fixed surface provided at the outer end of said track-way, and vertically adjustable means provided in the lower ends of said support frame.

3. A lathe comprising, in combination, a supporting structure providing a base, an extended track-way, an operating head carried on said base and having a work-carrying arbor movable longitudinally through the head in the direction of, and parallel to, the extended track-way, a bracket plate rockably mounted on one face of the base, adjustable elements on the inner end of said track-way engaging said bracket plate, and a vertically adjustable support frame adapted to rest on a fixed surface provided at the outer end of said track-way.

4. A lathe comprising, in combination, a supporting structure providing a stationary base, an extended track-way, an operating head carried on said base and having a work-carrying arbor movable longitudinally through the head in the direction of, and parallel to, the extended track-way, a bracket plate rockably mounted on the face of said base adapted for angular adjustment relative to said base, the lower ends of vertically adjustable elements threadedly received in the upper face of said bracket plate, the upper ends of said vertically adjustable elements engaging the inner end of said track-way, a support frame adapted to rest on a fixed surface provided at the outer end of said track-way, and vertically adjustable means provided in the lower ends of said support frame.

5. In a lathe, in combination, a supporting structure, providing a stationary base, an operating head carried on said base, a work-carrying arbor provided on said operating head and movable longitudinally therethrough, a track-way extending laterally from said base, a bracket plate rockably mounted on said base, adjustable elements provided on the inner end of said track-way for engagement with said bracket plate for permitting vertical adjustment of said inner end of the track-way, a vertically adjustable support frame adapted to rest on a fixed surface provided at the other end of said track-way, an outboard carriage slidably disposed upon said track-way comprising a base, a vertically adjustable post, and a bearing sleeve adapted for detachable connection with said arbor whereby said outboard carriage may be moved along said track-way to and away from the stationary base in response to movement of the arbor, said arbor being maintained in parallelism with said track-way by means of the adjustable element and vertically adjustable support frame.

HARRY B. BARRETT.

REFERENCES CITED

The following references are of record in the file of this patent:

UNITED STATES PATENTS

| Number | Name | Date |
|---|---|---|
| 326,049 | Mancaster | Sept. 8, 1885 |
| 734,639 | Wallenstein | July 28, 1903 |
| 926,612 | Rundle | June 29, 1909 |
| 1,374,320 | Pettkoske | Apr. 12, 1921 |
| 1,925,177 | Delf | Sept. 5, 1933 |
| 2,357,803 | Barrett | Sept. 12, 1944 |